Oct. 27, 1931.  A. H. JONES  1,829,657
SECURING ELEMENT
Filed Dec. 7, 1929

WITNESSES
Edw. Thorpe
Chris Feinle

INVENTOR
Allan H. Jones
BY
Munn & Co.
ATTORNEY

Patented Oct. 27, 1931

1,829,657

UNITED STATES PATENT OFFICE

ALLAN HETRICK JONES, OF TRENTON, NEW JERSEY, ASSIGNOR TO ROLLER BEARING COMPANY OF AMERICA, OF TRENTON, NEW JERSEY, A CORPORATION OF NEW JERSEY

SECURING ELEMENT

Application filed December 7, 1929. Serial No. 412,501.

This invention relates to a securing element to be used as a unit, sleeve or dowel, for securing together adjacent or contiguous pieces or parts of divers devices and machines and construction work.

The principal object of the invention is the provision of a securing element of the indicated character so constructed and formed as to be capable of radial expansion to tightly fit on a shaft or like part, to hold said shaft or the like against displacement, or to hold appurtenances on a shaft or the like against displacement, and which is also capable of radial contraction to tightly fit into alined holes in parts to secure them together.

Other objects are: to obviate screw threads and to save costs involved in cutting them in the usual nuts, shafts, bolts and the like; and to expedite the work of assembling parts.

The nature of the invention and its distinguishing features and advantages will appear when the following specification is read in connection with the accompanying drawings, in which Figure 1 is a view of a securing element partly in elevation and partly in section constructed in accordance with the invention;

Figure 1:

Referring now more particularly to Figure 1 of the drawings, it will be apparent that there is shown an element 10 consisting of a tubular body, round in cross-section and of uniform diameter throughout. The body is produced from a single piece of flat spring metal which is helically wound to provide normally spaced convolutions according to known methods of manufacture. A securing element so constructed and formed will be capable of radial expansion to increase the diameter thereof, and also capable of radial contraction to decrease the diameter thereof.

Within the invention, securing elements having the characteristics mentioned, will be made in any proportionate size, to obtain the desired strength and rigidity to suit particular requirements. It will therefore be understood that securing elements of different lengths and diameters are contemplated.

Figure 2:
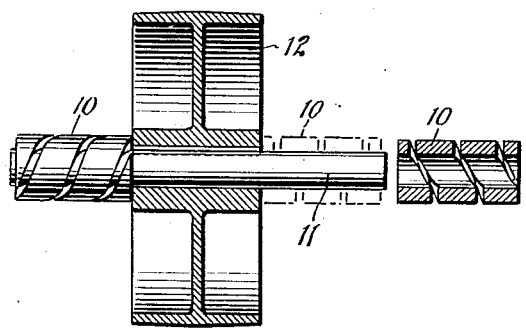
Figure 2 is a view illustrating one use of two securing elements, each constructed in accordance with the invention.

In Figure 2 there are shown two elements each constructed as set forth above. The elements 10 are applicable to a shaft 11 having a small pulley 12 loosely mounted. Each element 10 has an inside diameter slightly less than the diameter of the shaft 11. It will therefore be obvious that each element 10 may be driven on the shaft 11, one on each side of the pulley 12. In driving each element 10 on the shaft a hammer or other suitable tool or tools may be used. Each element 10 will be caused to expand radially from its normal condition, and due to the resiliency of the metal, the element will have the power of radial contraction to tightly grip the shaft. In this manner the pulley will be held in place on the shaft. Attention is now called to the fact that each of the elements 10 serves as a nut and that the expense of providing screw threads both to the shaft and securing elements is saved.

Figure 3:
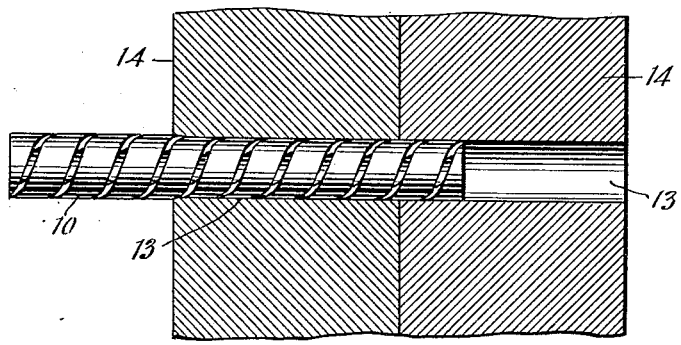
Figure 3 is a view illustrating another use of a single securing element constructed in accordance with the invention.

In Figure 3 use is made of a securing element 10 having the mentioned features, and is of suitable length and diameter to constitute a dowel. In practice the outside diameter thereof will be slightly larger than the diameters of the alined holes or bores 13 in the work pieces 14. In driving the element 10 into the alined holes or bores the element 10 will be forcefully contracted radially from its normal condition, and due to the resiliency of the metal, the element will have the power of radial expansion to tightly grip the walls of the holes or bores 13, to secure the pieces 14 together.

What is claimed is:

The combination with a cross-sectionally round part and a second part to be secured in place on the first part, of an element of tubular form, round in cross section made of a helically wound strip of flat spring metal, to present convolutions normally spaced, the internal diameter of said element being smaller than the diameter of said first part, said element being forced thereon in engagement with the second part, to secure the second part in place by reason of the fact that said element by contraction frictionally grips said first part.

ALLAN HETRICK JONES.